US012581054B2

(12) United States Patent
Yin et al.

(10) Patent No.: US 12,581,054 B2
(45) Date of Patent: Mar. 17, 2026

(54) IMAGE BASED LiDAR-CAMERA SYNCHRONIZATION

(71) Applicant: Motional AD LLC, Boston, MA (US)

(72) Inventors: QinYuan Yin, San Mateo, CA (US); Michael V. Morelli, Pittsburgh, PA (US); Changhao Li, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 413 days.

(21) Appl. No.: 18/163,119

(22) Filed: Feb. 1, 2023

(65) Prior Publication Data

US 2023/0388481 A1 Nov. 30, 2023

Related U.S. Application Data

(60) Provisional application No. 63/365,450, filed on May 27, 2022.

(51) Int. Cl.
*H04N 17/00* (2006.01)
*G01S 17/86* (2020.01)
(Continued)

(52) U.S. Cl.
CPC ........... *H04N 17/002* (2013.01); *G01S 17/86* (2020.01); *G06T 7/13* (2017.01); *G06T 7/60* (2013.01);
(Continued)

(58) Field of Classification Search
CPC ..... H04N 17/002; G01S 17/86; G01S 7/4026; G01S 7/4004; G01S 7/4972;
(Continued)

(56) References Cited

U.S. PATENT DOCUMENTS

2014/0100440 A1* 4/2014 Cheline ................... A61B 8/12
600/407
2014/0193057 A1* 7/2014 Zagrodsky ............... G06T 7/33
382/131
(Continued)

FOREIGN PATENT DOCUMENTS

CN 111435162 A 7/2020
CN 114217665 A 3/2022
(Continued)

OTHER PUBLICATIONS

Great Britain Office Action issued for Application No. GB 2414734. 0, dated Oct. 10, 2024.

(Continued)

*Primary Examiner* — Shefali D Goradia
(74) *Attorney, Agent, or Firm* — Knobbe, Martens, Olson & Bear, LLP

(57) ABSTRACT

Provided are methods, systems, and computer program products for image based LiDAR-camera synchronization. An example method may include: obtaining an image from an image sensor; detecting at least one edge of a pattern in the image, the pattern corresponding to at least one electromagnetic wave emitted from a rangefinder system; determining an offset between the pattern and the image based on the at least one edge of the pattern; determining the offset satisfies a synchronization threshold; and based on the determining the offset satisfies a synchronization threshold, adjusting a synchronization parameter of the image sensor or rangefinder system.

19 Claims, 13 Drawing Sheets

(51) Int. Cl.
  *G06T 7/13*          (2017.01)
  *G06T 7/60*          (2017.01)

(52) U.S. Cl.
  CPC ............... *G06T 2207/20084* (2013.01); *G06T 2207/30252* (2013.01)

(58) Field of Classification Search
  CPC .... G01S 13/867; G01S 13/931; G01S 17/931; G01S 7/497; G06T 7/13; G06T 7/60; G06T 2207/20084; G06T 2207/30252; G06T 7/174; G06T 7/73; G06T 2207/10028; G06T 2207/30236; G06T 2207/30256; G06T 2207/30261; B60W 2420/403; B60W 2420/408
  See application file for complete search history.

(56)                References Cited

U.S. PATENT DOCUMENTS

| | | | |
|---|---|---|---|
| 2020/0018852 A1* | 1/2020 | Walls ................... | G01S 7/4972 |
| 2022/0003855 A1* | 1/2022 | Zhu ........................ | G01S 7/4808 |
| 2025/0185920 A1* | 6/2025 | Cheline ............... | A61B 6/5217 |

FOREIGN PATENT DOCUMENTS

| | | | |
|---|---|---|---|
| KR | 10-2014-0066408 A | 6/2014 |
| KR | 10-2020-0023974 A | 3/2020 |
| KR | 10-2118125 B1 | 6/2020 |
| WO | WO 2023/123416 A1 | 7/2023 |

OTHER PUBLICATIONS

Great Britain Office Action issued for Application No. GB 2414734.0, dated Apr. 15, 2025.

Korean Office Action received for KR Application No. 10-2023-0031566, mailed Jul. 21, 2025.

Khurana, A. et al., "Extrinsic Calibration Methods for Laser Range Finder and Camera: A Systematic Review", MAPAN—Journal of Metrology Society of India, Sep. 2021, vol. 36(3), pp. 669-690.

SAE On-Road Automated Vehicle Standards Committee, "SAE International's Standard J3016: Taxonomy and Definitions for Terms Related to Driving Automation Systems for On-Road Motor Vehicles", Jun. 2018, in 35 pages.

Great Britain Office Action (Preliminary Report) issued for Application No. GB 2302605.7, dated Mar. 19, 2023.

Great Britain Office Action issued for Application No. GB 2302605.7, dated Aug. 24, 2023.

* cited by examiner

Synchronization Environment 500A

700

702

Obtain an image from an image sensor

704

Detect at least one edge of a pattern in the image, the pattern corresponding to at least one electromagnetic wave emitted from a rangefinder system

706

Determine an offset between the pattern and the image based on the at least one edge of the pattern

708

Determine the offset satisfies a synchronization threshold

710

Based on the determining the offset satisfies a synchronization threshold, adjust a synchronization parameter

FIG. 7

IMAGE BASED LiDAR-CAMERA SYNCHRONIZATION

INCORPORATION BY REFERENCE TO ANY PRIORITY APPLICATIONS

This application claims the priority benefit of U.S. Provisional Patent Application No. 63/365,450, entitled IMAGE BASED LIDAR-CAMERA SYNCHRONIZATION, filed on May 27, 2022, which is incorporated herein by reference in its entirety.

BRIEF DESCRIPTION OF THE FIGURES

FIG. 7 is a flow diagram illustrating an example of a routine implemented by one or more processors to confirm sync is sufficient, according to certain cases of the disclosure.

DETAILED DESCRIPTION

Figure 1:
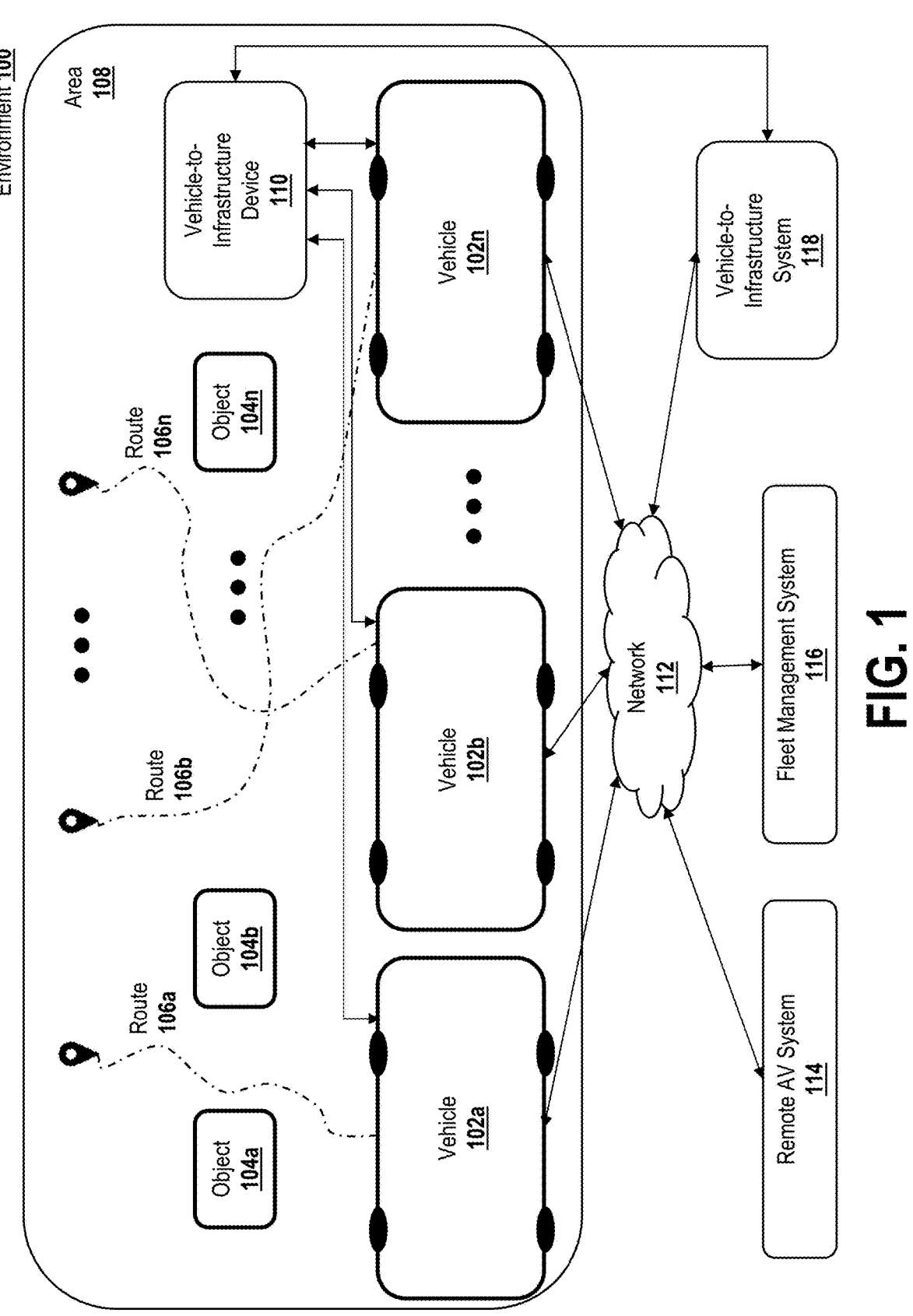
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit)

processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

An autonomous vehicle may use different types of sensors to perceive its environment. For example, an autonomous vehicle may use a camera sensor, LiDAR sensor, and/or a RADAR sensor, to "see" or perceive its environment. When using different types of sensors, in some cases, the sensors may not be aligned or synchronized. This can cause errors in perception as different sensors may be sensing environmental objects at different times and passing their respective data into the perception data feed, thus having different determinations for location or movement for the objects. Some perception systems may incur additional computation processing requirements to digitally synchronize the environmental objects (e.g., by interpolation between different sensing cycles, or retrieving data for previous sensing cycles, or other methodologies). Instead, some perception systems may ensure the different sensors are synchronized so as to pass respective data into the perception data feed for a same environment at a same time.

In some cases, different types of sensors (e.g., LiDAR and camera sensors) can be synchronized by analyzing both types of data (e.g., the LiDAR data and the camera data). The analysis may compare time stamps and/or features included in respective data sets (e.g., features in image compared to features in LiDAR data). The analysis can be computationally expensive and time consuming. For instance, point cloud data may be an order of magnitude or more in size in comparison to camera images. Moreover, such analysis may require a moving object in the field of view, requiring coordination and additional compute resources.

As described herein, in some cases, synchronization between multiple types of sensors can be accomplished using one sensor type. In certain cases, the synchronization can be performed using only one sensor type, however, it will be understood that multiple types can be used in some cases. By synchronizing different types of sensors using a single type of an image, the system can reduce the amount of hardware used, reduce synchronization time, and free up compute resources.

In some aspects and/or embodiments, systems, methods, and computer program products described herein include and/or implement a synchronization system. As a non-limiting example, the synchronization system may determine whether cameras and LiDAR sensors are synchronized or not. For instance, the synchronization system may obtain an image from an image sensor (e.g., the camera); detect at least one edge of a pattern in the image, the pattern corresponding to at least one electromagnetic wave emitted from a rangefinder system (e.g., the LiDAR sensors); determine an offset between the pattern and the image based on the at least one edge of the pattern; determine whether the offset satisfies a synchronization threshold; and based on the determining the offset satisfies a synchronization threshold, adjust a synchronization parameter of the image sensor or rangefinder system. By adjusting a synchronization parameter, the synchronization system may re-synchronize the camera and LiDAR sensors. In the case that the offset does not satisfy the synchronization threshold, the synchronization system 502 may inform the perception system 402 that the systems are synchronized.

Moreover, in some cases, the systems and methods of the present disclosure may also adjust the synchronization between cameras and the LiDAR sensors if an offset is determined. Thus, in this case, reducing potential system error (e.g., in downstream processes of the perception system 402).

Furthermore, in some cases, if an offset is determined (e.g., at least once or at least a threshold number of times within a period of time), the systems and methods of the present disclosure may determine a life-time decay, pre-break detection, or a fault of the cameras and/or the LiDAR sensors and transmit a message to a health/maintenance system associated with the autonomous vehicle. Thus, in this case, the system and methods of the present disclosure may increase safety (e.g., by detecting system errors and/or failures) and reduce autonomous vehicle downtime (e.g., by providing context for particular errors in perception that the camera and LiDAR are de-synchronized).

Furthermore, in some cases, the systems and methods may determine and confirm dynamic checks based on parameter changes in run-time. For instance, if a parameter is changed (exposure, integration times, lidar rotation speed, and the like), the lidar pattern within a camera image may be confirmed in a next set of images captured. Thus, the systems and methods may provide a feedback loop to validate a change to a parameter has been implemented successfully.

By virtue of the implementation of systems, methods, and computer program products described herein, an autonomous vehicle or AV system can determine whether different types of sensors (e.g., camera and LiDAR sensors) are synchronized or not based on images from one type of sensor (e.g., the camera) and act accordingly (e.g., inform a perception system, adjust synchronization, or inform a maintenance system). Therefore, systems of the present disclosure may save computations and computation time, increase safety, and reduce autonomous vehicle downtime.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g., a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high-level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high-level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
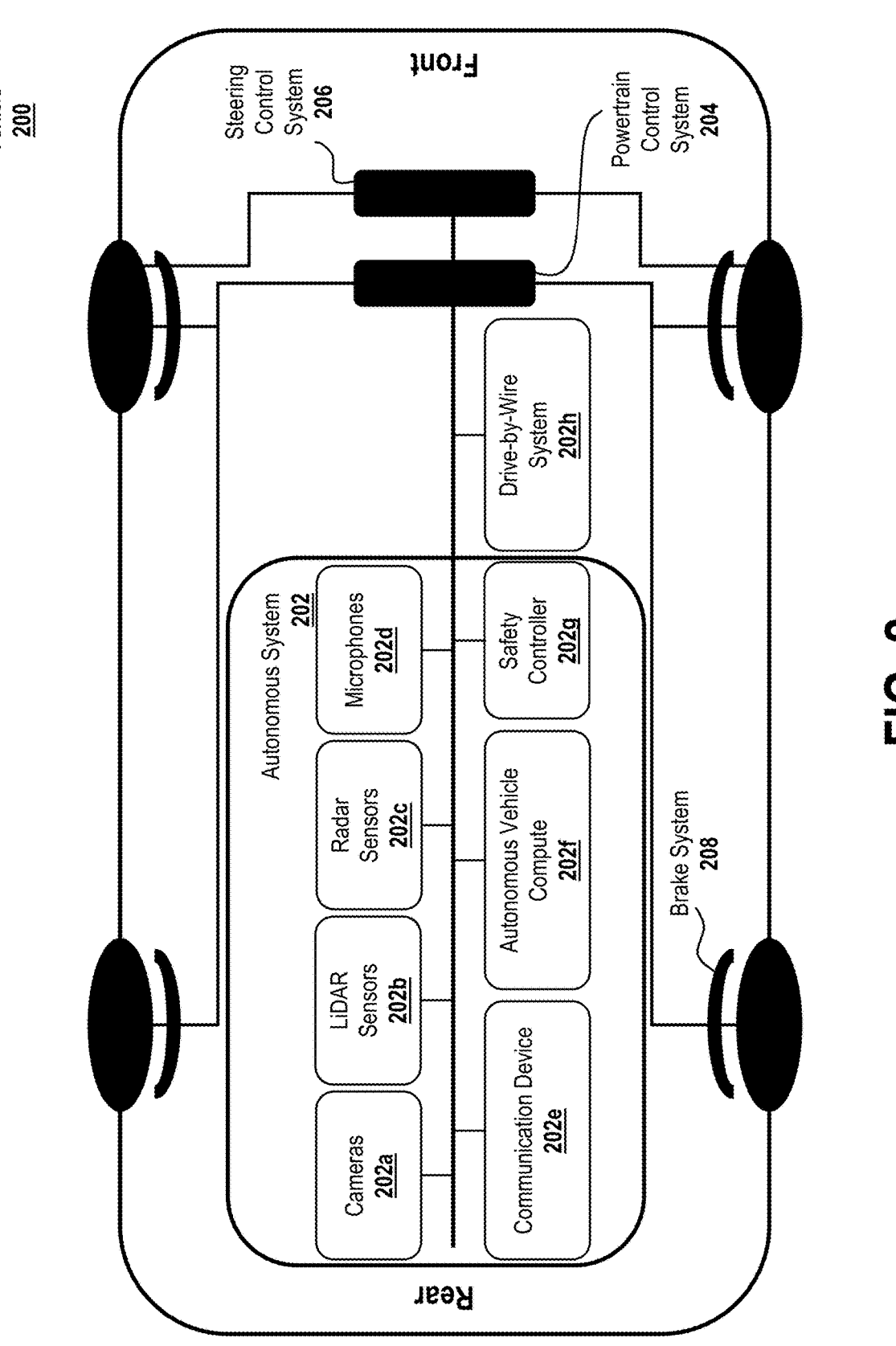
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment

100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
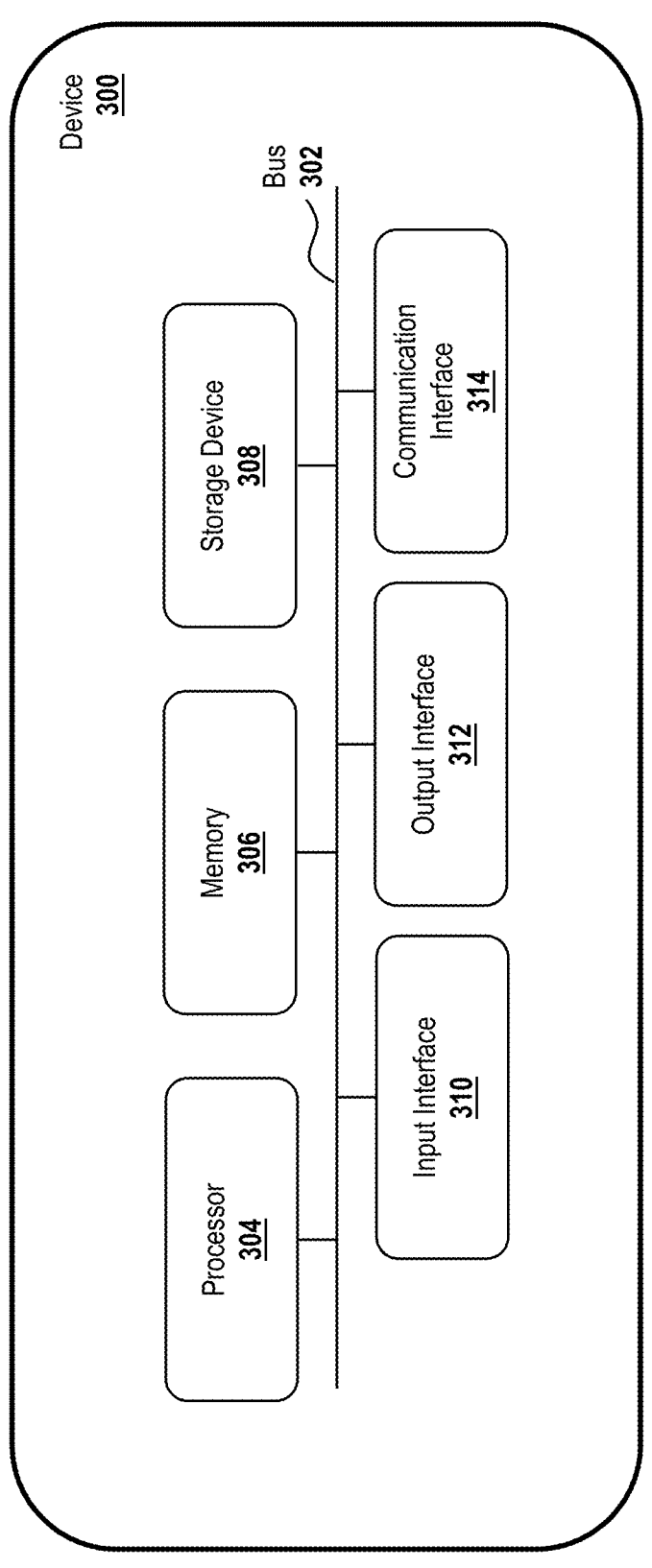
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data (TLD data) associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202*b* encounters a physical object (e.g., a vehicle) and is reflected back to LiDAR sensors 202*b*. In some embodiments, the light emitted by LiDAR sensors 202*b* does not penetrate the physical objects that the light encounters. LiDAR sensors 202*b* also include at least one light detector which detects the light that was emitted from the light emitter after the light encounters a physical object. In some embodiments, at least one data processing system associated with LiDAR sensors 202*b* generates an image (e.g., a point cloud, a combined point cloud, and/or the like) representing the objects included in a field of view of LiDAR sensors 202*b*. In some examples, the at least one data processing system associated with LiDAR sensor 202*b* generates an image that represents the boundaries of a physical object, the surfaces (e.g., the topology of the surfaces) of the physical object, and/or the like. In such an example, the image is used to determine the boundaries of physical objects in the field of view of LiDAR sensors 202*b*.

Radio Detection and Ranging (radar) sensors 202*c* include at least one device configured to be in communication with communication device 202*e*, autonomous vehicle compute 202*f*, and/or safety controller 202*g* via a bus (e.g., a bus that is the same as or similar to bus 302 of FIG. 3). Radar sensors 202*c* include a system configured to transmit radio waves (either pulsed or continuously). The radio waves transmitted by radar sensors 202*c* include radio waves that are within a predetermined spectrum. In some embodiments, during operation, radio waves transmitted by radar sensors 202*c* encounter a physical object and are reflected back to radar sensors 202*c*. In some embodiments, the radio waves transmitted by radar sensors 202*c* are not reflected by some objects. In some embodiments, at least one data processing system associated with radar sensors 202*c* generates signals representing the objects included in a field of view of radar sensors 202*c*. For example, the at least one data processing system associated with radar sensor 202*c* generates an image that represents the boundaries of a physical object, the surfaces (e.g., the topology of the surfaces) of the physical object, and/or the like. In some examples, the image is used to determine the boundaries of physical objects in the field of view of radar sensors 202*c*.

Microphones 202*d* includes at least one device configured to be in communication with communication device 202*e*, autonomous vehicle compute 202*f*, and/or safety controller 202*g* via a bus (e.g., a bus that is the same as or similar to bus 302 of FIG. 3). Microphones 202*d* include one or more microphones (e.g., array microphones, external microphones, and/or the like) that capture audio signals and generate data associated with (e.g., representing) the audio signals. In some examples, microphones 202*d* include transducer devices and/or like devices. In some embodiments, one or more systems described herein can receive the data generated by microphones 202*d* and determine a position of an object relative to vehicle 200 (e.g., a distance and/or the like) based on the audio signals associated with the data.

Communication device 202*e* include at least one device configured to be in communication with cameras 202*a*, LiDAR sensors 202*b*, radar sensors 202*c*, microphones 202*d*, autonomous vehicle compute 202*f*, safety controller 202*g*, and/or DBW system 202*h*. For example, communication device 202*e* may include a device that is the same as or similar to communication interface 314 of FIG. 3. In some embodiments, communication device 202*e* includes a vehicle-to-vehicle (V2V) communication device (e.g., a device that enables wireless communication of data between vehicles).

Autonomous vehicle compute 202*f* include at least one device configured to be in communication with cameras 202*a*, LiDAR sensors 202*b*, radar sensors 202*c*, microphones 202*d*, communication device 202*e*, safety controller 202*g*, and/or DBW system 202*h*. In some examples, autonomous vehicle compute 202*f* includes a device such as a client device, a mobile device (e.g., a cellular telephone, a tablet, and/or the like), a server (e.g., a computing device including one or more central processing units, graphical processing units, and/or the like), and/or the like. In some embodiments, autonomous vehicle compute 202*f* is the same as or similar to autonomous vehicle compute 400, described herein. Additionally, or alternatively, in some embodiments autonomous vehicle compute 202*f* is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202*g* includes at least one device configured to be in communication with cameras 202*a*, LiDAR sensors 202*b*, radar sensors 202*c*, microphones 202*d*, communication device 202*e*, autonomous vehicle computer 202*f*, and/or DBW system 202*h*. In some examples, safety controller 202*g* includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202*g* is configured to generate control signals that take precedence over (e.g., overrides) control signals generated and/or transmitted by autonomous vehicle compute 202*f*.

DBW system 202*h* includes at least one device configured to be in communication with communication device 202*e* and/or autonomous vehicle compute 202*f*. In some examples, DBW system 202*h* includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202*h* are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202*h*. In some examples, powertrain control system 204 includes at least one controller, actuator, and/or the like. In some embodiments, powertrain control system 204 receives control signals from DBW system 202*h* and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), and/or one or more devices of network 112 (e.g., one or more devices of a system of network 112). In some embodiments, one or more devices of vehicles 102 (e.g., one or more devices of a system of vehicles 102), and/or one or more devices of network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some cases, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid-state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally, or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) B) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally, or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally, or alternatively, a set of components (e.g., one or more components) of device 300 can perform one or more functions described as being performed by another component or another set of components of device 300.

Referring now to FIG. 4, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202*f* of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202*b*) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4A:
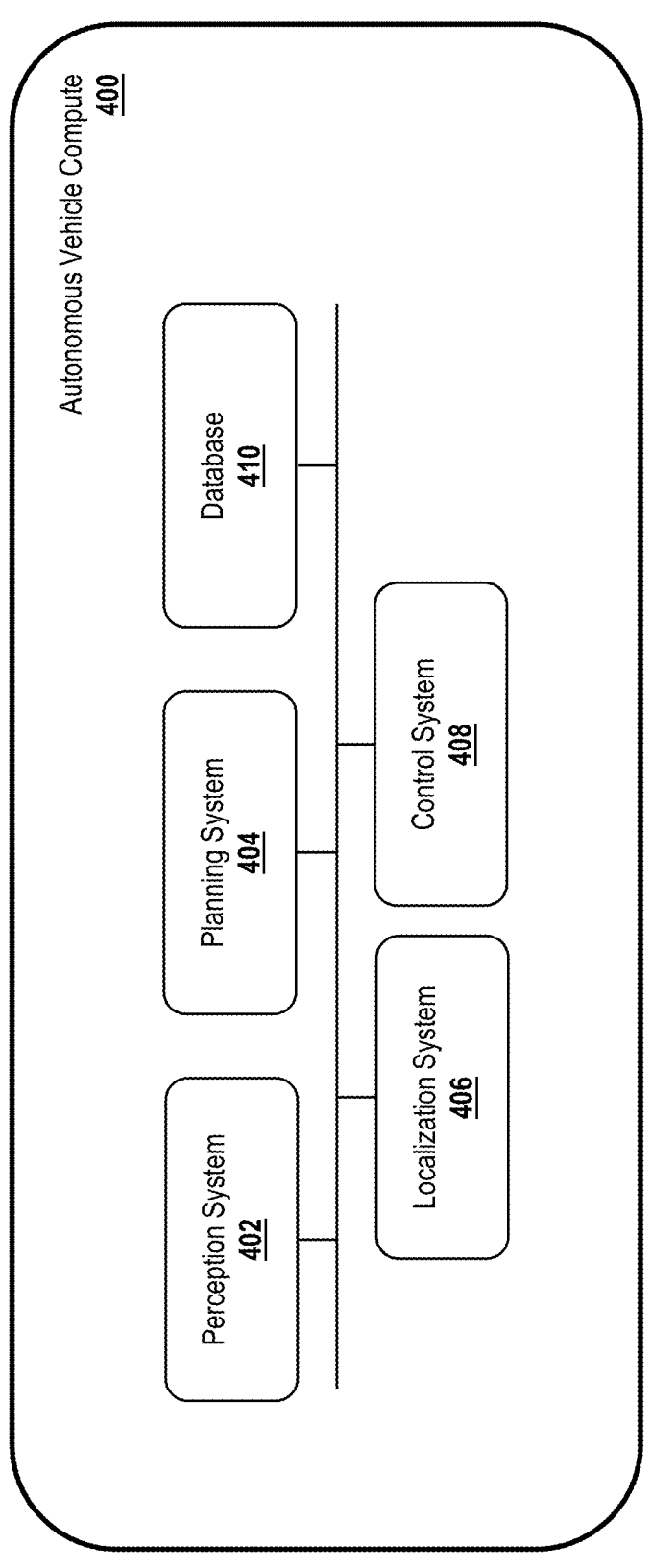
FIG. 4A is a diagram of certain components of an autonomous system.
Figure 4B:
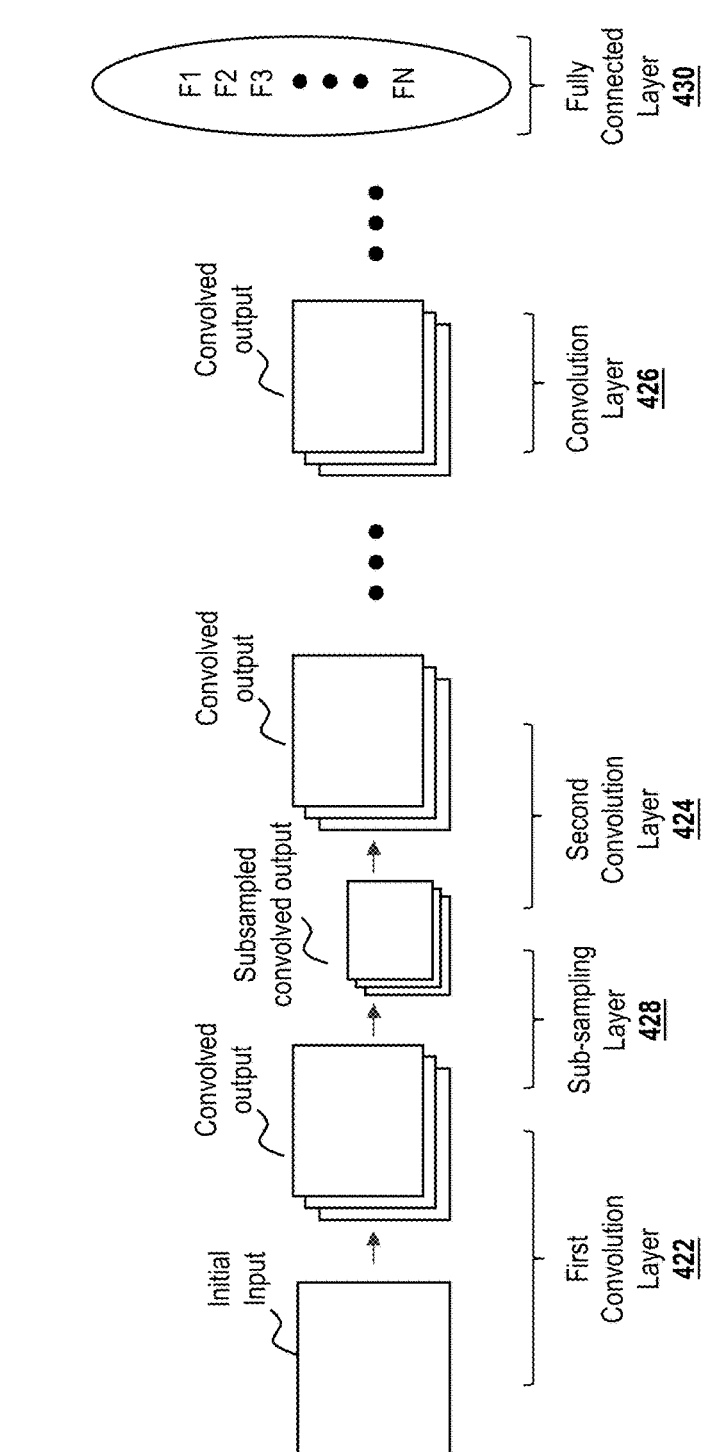
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolulution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 430 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
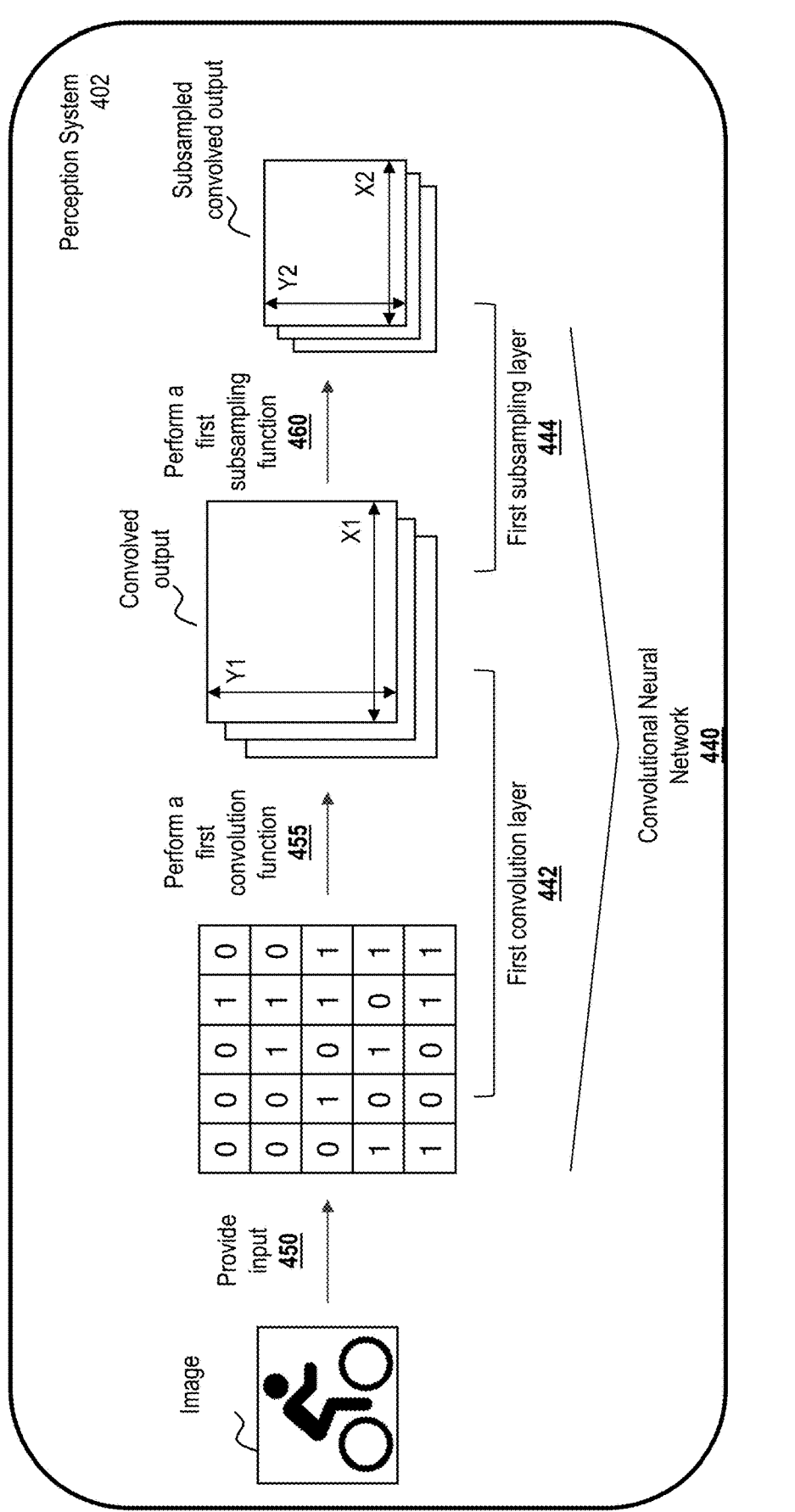
FIGS. 4C and 4D are a diagram illustrating example operation of a CNN.
Figure 4D:
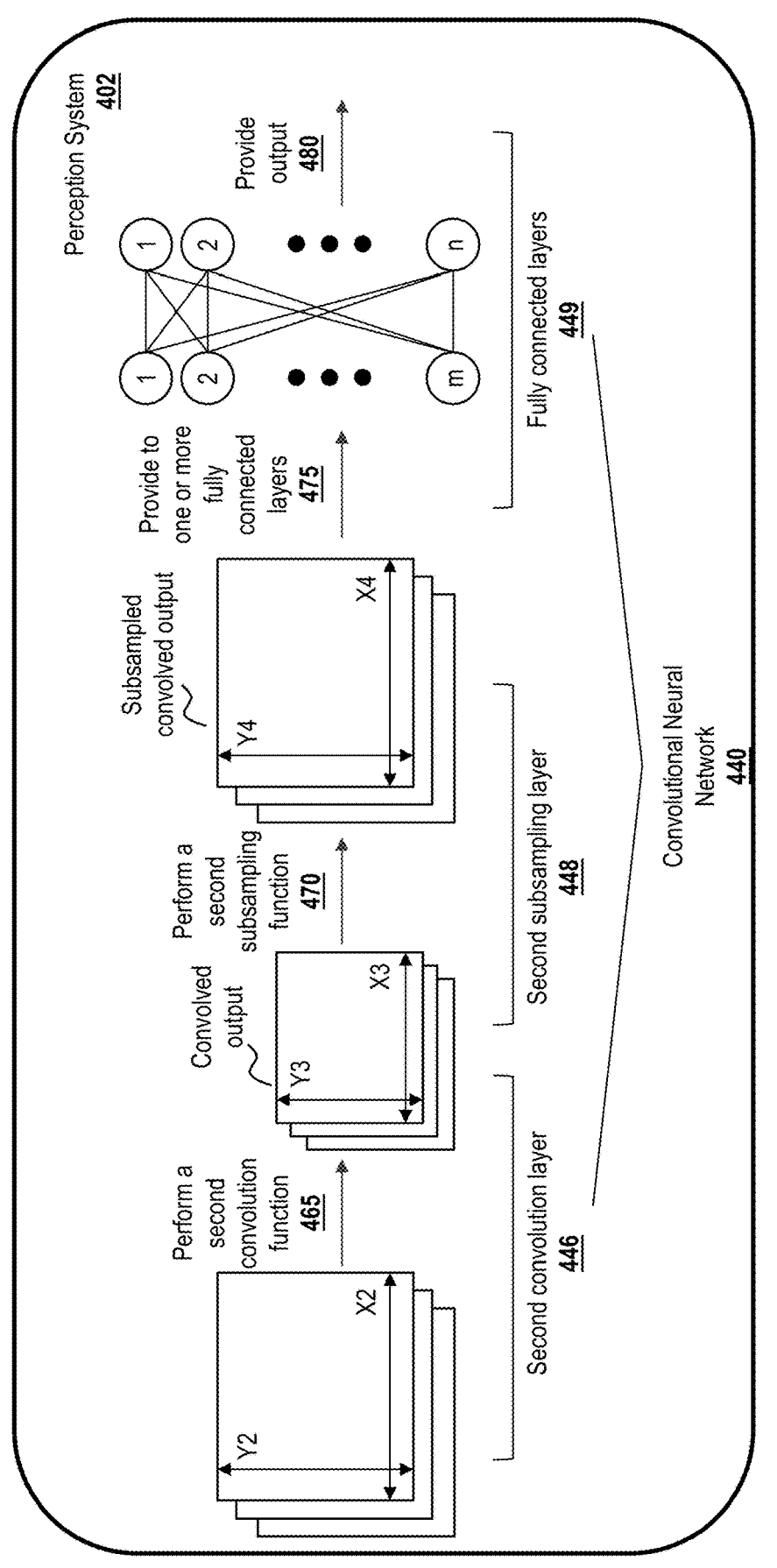

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Synchronization System

As described herein, a vehicle may use different types of sensors to perceive its environment. Synchronizing the different types of sensors can be difficult and time consuming and may use multiple types of images. To improve synchronizations and safety, a system can use one type of image to synchronize sensor data associated with different types of sensors.

Figure 5A:
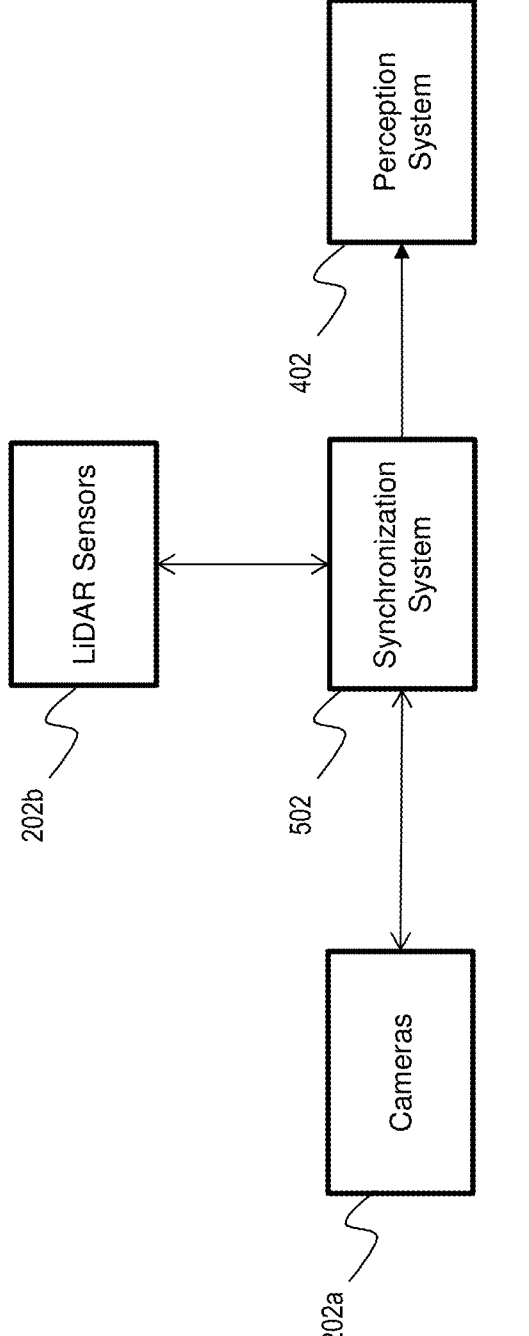
FIG. 5A is a block diagram illustrating a synchronization system, according to certain cases of the disclosure.

FIG. 5A is a block diagram illustrating an example of a synchronization environment 500A for synchronizing different types of sensors. The synchronization environment 500A may include the LiDAR sensors 202*b*, the cameras 202*a*, a synchronization system 502 and the perception system 402. The synchronization system 502 may determine whether the LiDAR sensors 202*b* and the cameras 202*a* are synchronized or not and inform, e.g., the perception system 402. In some cases, the synchronization system 502 can be implemented using one or more processors of the perception system 402 or another system that checks for health and system status functionality, such as the control system 408, the planning system 404, and the like.

While the present examples describe features and technology with respect to cameras and LiDAR sensors, any pair of sensing devices have an overlapping range of sensing electromagnetic waves may utilize features and benefits of the present disclosure. For instance, in the case of cameras and LiDAR sensors, the cameras may sense infrared light emitted by the LiDAR sensors. However, high energy radar electromagnetic waves may be sensed by certain cameras, so the concepts and features of the present disclosure may be applied to different pairings of sensing devices. Accordingly, it will be understood that reference to LiDAR sensors, LiDAR images, LiDAR pixels, etc. is not to be limiting and that other technologies can be used such as radar sensors, radar images, radar pixels, etc.

As described herein, the LiDAR sensors 202*b* can transmit light from a light emitter (e.g., the laser transmitter) and detect the light after it has been reflected from one or more objects in an environment. Light emitted by LiDAR sensors 202*b* include light (e.g., infrared light and/or the like) that may be outside of the visible spectrum. In some cases, during operation, light emitted by LiDAR sensors 202*b* encounters a physical object (e.g., a vehicle) and is reflected back to LiDAR sensors 202*b* and/or the cameras 202*a*.

As described herein, the cameras 202*a* may include the at least one camera (e.g., the digital camera using the light sensor such as the charge-coupled device (CCD), the thermal camera, the infrared (IR) camera, the event camera, and/or the like) to capture images including physical objects (e.g., cars, buses, curbs, people, and/or the like) based on light received by the at least one camera. In some cases, camera 202*a* generates camera data as output. In some examples, camera 202*a* generates camera data that includes image data associated with an image. In this example, the image data may specify the at least one parameter (e.g., image characteristics such as exposure, brightness, etc., an image timestamp, and/or the like) corresponding to the image. In such an example, the image may be in a format (e.g., RAW, JPEG, PNG, and/or the like).

In some cases, the light received by the at least one camera may include light emitted by the LiDAR sensors 202*b* and reflected back to the at least one camera. In some cases, a range of electromagnetic wave emitted by the LiDAR sensors 202*b* may overlap a range of electromagnetic wave sensed by the at least one camera. In this case, the camera data for the image may include data regarding a sensing cycle of the LiDAR sensors 202*b*. The sensing cycle of the LiDAR sensors 202*b* may indicate a frequency (e.g., a number of times per second) and starting angle (e.g., an azimuth angle). Generally, the sensing cycle of the LiDAR sensors 202b may be the same or different (but whole number ratio) to a sensing cycle of the at least one camera of the cameras 202a. In this manner, images from the cameras 202a may be synchronized to lidar data from the LiDAR sensors 202b and capture data regarding an environment at a same time.

In some cases, the sensing cycle of the LiDAR sensors 202b (referred to as LiDAR sensing cycle) and the sensing cycle of the cameras 202a (referred to as camera sensing cycle) may be controlled by a shared clock and offsets. For instance, the camera sensing cycle may have a camera time offset (referred to alternatively as image sensor triggering timing) to start generating image data associated with an image at a particular point in time every period, while the LiDAR sensors 202b may have a LiDAR offset (referred to as phase lock angle) to start emitting light and generating LiDAR data at the particular point in time at a particular azimuth angle (of a 360-degree cycle of the LiDAR sensors 202b).

Figure 5B:
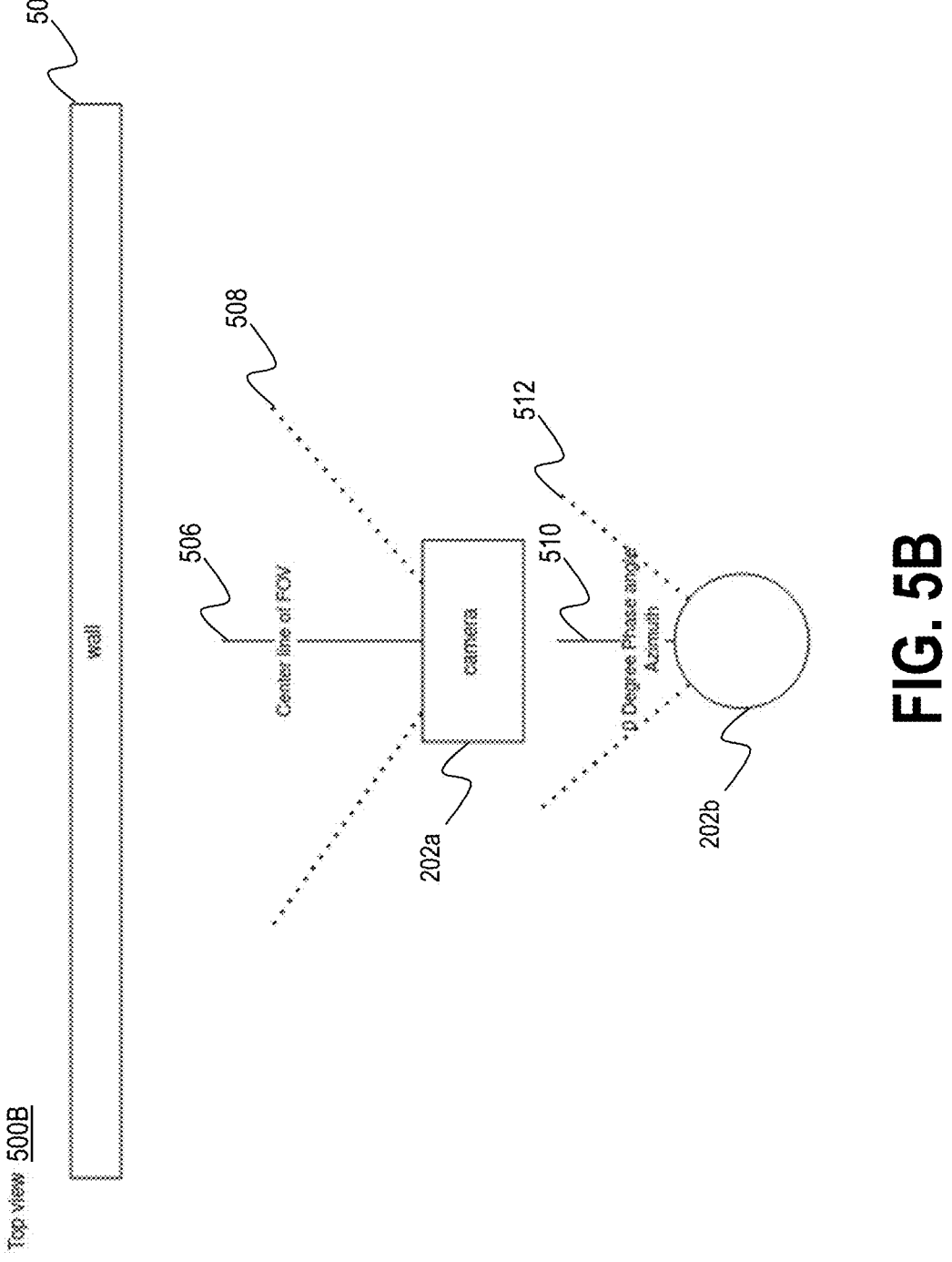
FIG. 5B is a block diagram illustrating an example environment of a synchronization system, according to certain cases of the disclosure.

FIG. 5B is a block diagram illustrating a top view of an example environment 500B to synchronize different types of sensors. The environment 500B includes a LiDAR sensor 202b and a camera 202a arranged (e.g., on the autonomous vehicle or bench top set up as if arranged on the autonomous vehicle) with respect to an object 504 (e.g., a wall).

As depicted in the environment 500B, the camera 202a may have a camera field of view 508 and a camera center line 506, and the LiDAR sensor 202b may have a LiDAR field of view 512 (at a given point phase angle in the 360-degree cycle) and a phase angle 510 associated with the LiDAR field of view 512 (e.g., a center of the LiDAR field of view 512 associated with the azimuth angle at the given point in the 360-degree cycle).

The camera field of view 508 may correspond to a sensing area the camera 202a can sense for a given focal length and sensor size. In certain cases, the sensing area can be a maximum sensing area of the cameras 202a.

The LiDAR field of view 512 may correspond to a sensing area of the LiDAR sensor 202b at the phase angle 510. In certain cases, the sensing area can be a maximum sensing area of the LiDAR sensor 202b. Depending on the camera and LiDAR systems used, the camera field of view 508 may be the same or different than the LiDAR field of view 512. Depending on the arrangement of the camera and LiDAR systems used, the camera center line 506 may be aligned with the phase angle 510 or angled at an offset.

Returning to FIG. 5A, the synchronization system 502, can receive a camera image and process the camera image to determine whether a camera 202a and a LiDAR sensors 202b are synchronized or not. In some cases, the synchronization system 502 may obtain an (camera) image from an image sensor (e.g., a camera 202a) and detect at least one edge of a pattern in the image. As described herein, the pattern can correspond to at least one electromagnetic wave emitted from a rangefinder system (e.g., the LiDAR sensors 202b).

The synchronization system 502 can determine an offset between the pattern and a particular location on the (camera) image and determine whether the offset satisfies a synchronization threshold. If the offset satisfies the synchronization threshold, the synchronization system 502 can adjust a synchronization parameter of the image sensor or rangefinder system. If the offset does not satisfy the synchronization threshold, the synchronization system 502 may inform the perception system 402 or user that the systems are synchronized.

In cases where the offset satisfies the synchronization threshold, the synchronization system 502 can make or indicate adjustments for the different types of sensors. For example, if the synchronization system 502 determines an offset satisfies a synchronization threshold (e.g., at least once or at least a threshold number of times within a period of time), the synchronization system 502 can determine a fault of the corresponding sensors (e.g., cameras 202a and/or the LiDAR sensors 202b) and transmit a message to a health/maintenance system associated with the autonomous vehicle.

In some cases, the synchronization system 502 may adjust a parameter of the sensor(s) and/or monitor the synchronization after a parameter has been adjusted. For instance, if a sensor parameter is changed (exposure time of a camera, integration times, lidar rotation speed, and the like), the synchronization system 502 can reevaluate the synchronization between the different types of sensors (e.g., camera and the lidar) based on additional images captured by the camera (and lidar patterns captured within the camera image). Thus, the synchronization system 502 may provide a feedback loop to validate a change to a parameter has been implemented successfully. Accordingly, the system and methods of the present disclosure may increase safety (e.g., by detecting system errors and/or failures) and reduce the downtime of autonomous vehicles (e.g., by providing context for particular errors in perception that the camera and LiDAR are de-synchronized).

Figure 5C:
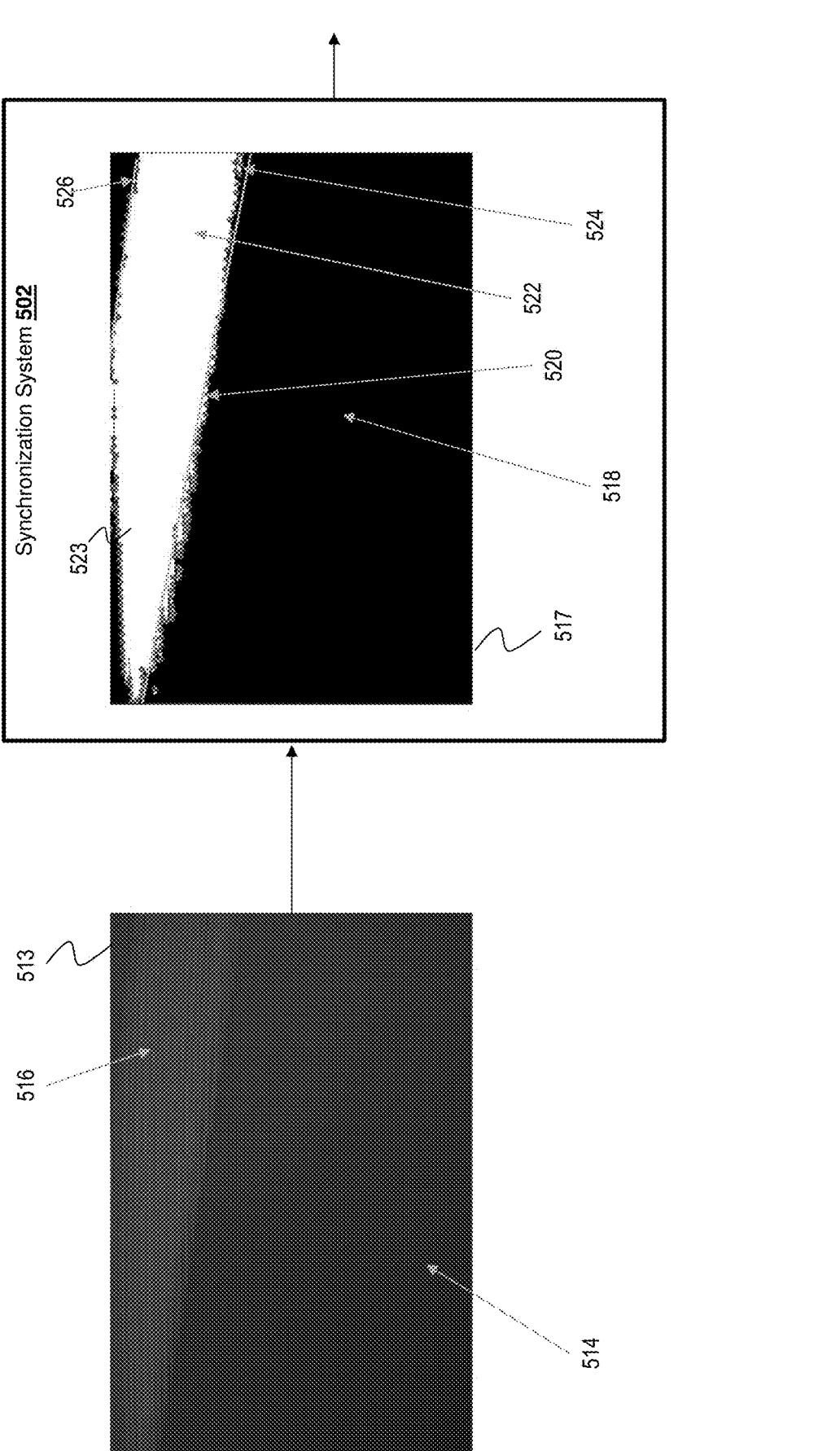
FIG. 5C is a data flow diagram illustrating an example of the synchronization system receiving an example pre-processing camera image as input and outputting a corresponding post processing camera image.

FIG. 5C is a data flow diagram illustrating an example of the synchronization system 502 receiving an example pre-processing camera image 513 as input and processing the pre-processing camera image 513 to identify one or more features as shown in camera image 517.

In the illustrated example, the pre-processing image 513 includes image pixels 514 (e.g., from the camera field of view 508) as sensed by a camera 202a. As described herein, certain pixels of the camera pixels 514 are illuminated by electromagnetic waves from a rangefinder such as a LiDAR sensor (also referred to herein as lidar pixels 516). The lidar pixels 516 may indicate light emitted by LiDAR sensors 202b and reflected back to the sensor of the camera 202a. For instance, in some cases, such as when an infrared filter of a camera 202a is removed from the camera 202a, the camera 202a may detect reflected LiDAR light.

To obtain the pre-processing image 513 from the image sensor (e.g., the cameras 202a), the synchronization system 502 may request a sample image from the image sensor (in accordance with camera sensing cycle) or receive one more images over a period of time from the image sensor (each from one cycle of the camera sensing cycle). For instance, the camera 202a may provide the camera data for each image at each or some subset of camera sensing cycles (e.g., every other image, every third image, and the like).

As described herein, the synchronization system 502 can process the pre-processing image 513 to generate the features shown in the camera image 517. In some cases, the synchronization system 502 can process the background pixels 514 and lidar pixels 516 to identify the background pixels 518, lidar pixels 522, and boundary points 520. The lidar pixels 522 and boundary points 520 can form a pattern 523 in the image 517.

In certain cases, the synchronization system 502 may detect the lidar pixels 522 and/or the boundary points 520 using one or more image detection processes. In some cases, the synchronization system 502 can apply one or more filters to the camera image 513 to identify the lidar pixels 522, the boundary points 520, and/or pattern 523. The filters can include different lines, shapes, slopes, etc. In some cases, the synchronization system 502 can identify the boundary points 520 or boundary of the pattern 523 by identifying filters that match the shape or slope of the boundary of the pattern 523.

In certain cases, the synchronization system 502 can use a machine learning model to identify the boundary points 520, lidar pixels 522, and/or pattern 523. For instance, a machine learning model (e.g., hosted and executed by the synchronization system 502) can be trained using camera images that have been labeled to identify lidar pixels, background pixels, and/or boundaries between identify lidar pixels, background pixels, including edges 524, 526. In some such cases, the machine learning model may detect a segment of the pre-processing image 513 that corresponds to the lidar pixels 516 and identify the corresponding pixels as the detected lidar pixels 522 and the shape of the detected lidar pixels 522 as the pattern 523. The machine learning model may also detect the boundary points 520 and/or a boundary of the pattern 523 based on the edge of the image 513 and/or the labels in the ground truth data, which can correspond to pixels that share a neighbor with a pixel different than itself, and the like.

The synchronization system 502 can also detect detected edges 524 and 526 for the camera image 517. In some cases, the detected edges 524 and 526 may be determined from the boundary points 520, a shape/area of the detected lidar pixels 522 (e.g., the pattern 523), and/or determined by the machine learning model. As an example, the detected edges 524 and 526 may be determined by a best fit line along a leading and trailing edge of the boundary points 520.

In some cases, the detected edges 524 and 526 may be determined based on an expected pattern of at least one electromagnetic wave emitted from a rangefinder system (e.g., the LiDAR sensors 202b). In some cases, the image is a camera image and the sensing device is a camera. In some cases, the rangefinder system is a LiDAR, the electromagnetic wave is an optical beam, and the pattern 523 is a LiDAR pattern. In some cases, the electromagnetic wave is a radio wave, the rangefinder system is a radar, and the pattern 523 is a radar pattern.

In some cases, the pattern 523 may form a parallelogram in the image 517. In other cases, the pattern 523 may form a curve, an ellipse, a rectangle, a square, a circle, or generally a known geometric pattern, depending on how the image sensing device (e.g., the camera) scans an environment and the rangefinder system (LiDAR sensors) scans the same environment. For instance, the rangefinder system may be configured to rotate horizontally, and the image sensor may be configured to scan horizontally at a slower speed than the rotation of the rangefinder system, thus generating a parallelogram in the camera image 517.

Figure 6A:
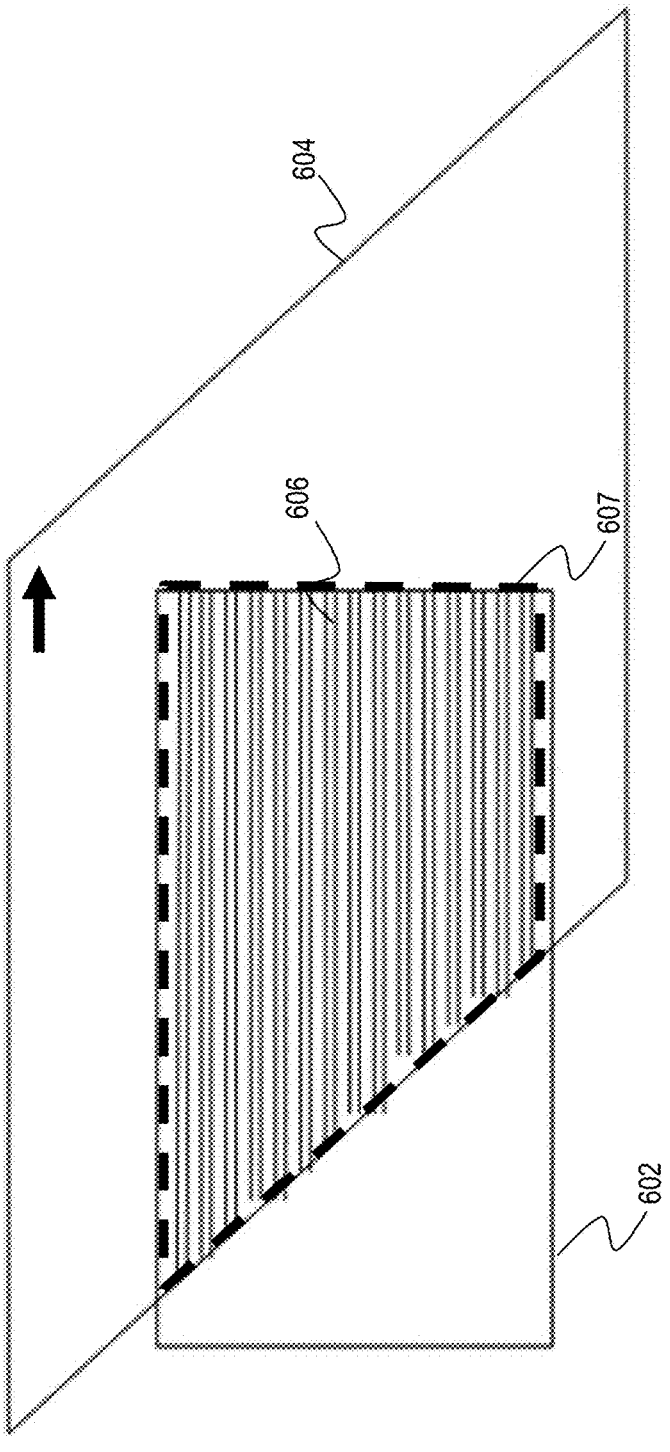
FIGS. 6A-6C depict representative image metrics of a synchronization system, according to certain cases of the disclosure.
Figure 6C:
Figure 6C:
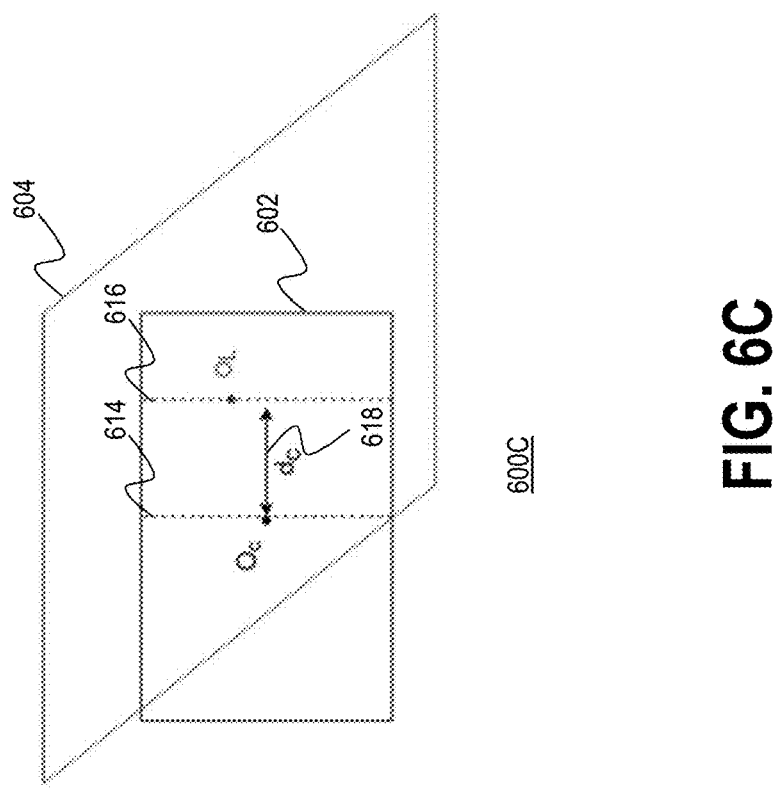
Figure 6B:
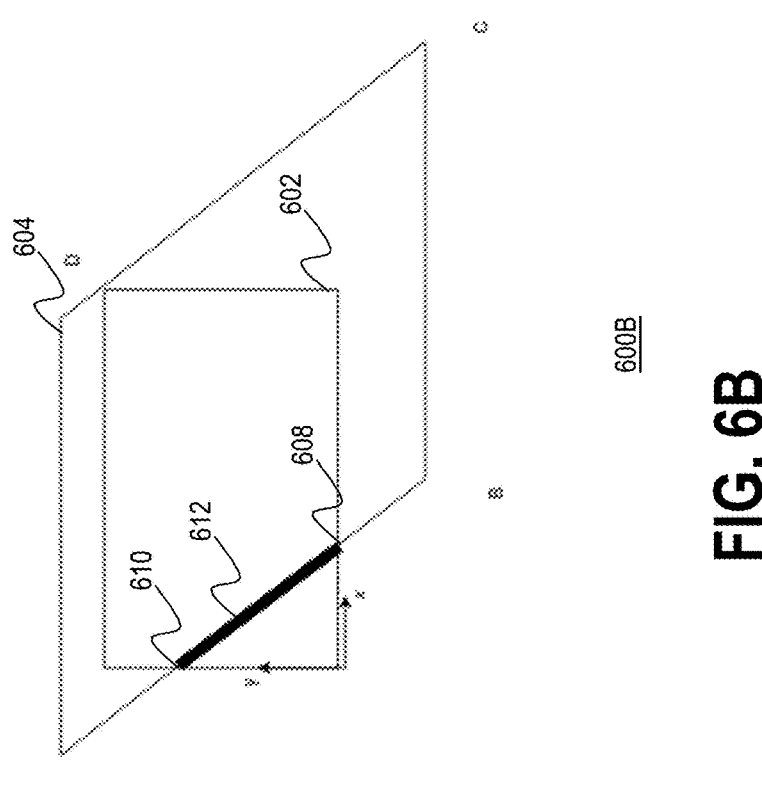

FIGS. 6A-6C are diagrams illustrating representative image metrics that can be determined by the synchronization system 502. FIG. 6A illustrates a lidar scan 604 overlapping a camera image 602, with detected lidar pixels 606 of the camera image 602.

In some cases, a camera sensor of the cameras 202a may read cells row by row, from a top of the image 602 down (see for instance the horizontal lines of detected lidar pixels 606). In the illustrated example, the read moves left to right (from top to bottom) and the lidar scan also moves from left to right, however, it will be understood that either scan may happen in a different and/or any direction (e.g., top-down, down-up, right-left, etc.).

Depending on exposure time of the camera sensor, a lidar rotation speed, camera field of view 508, and/or the LiDAR field of view 512, an entire lidar scan 604 may not be captured in the image 602. Accordingly, in some cases, the camera sensor may read pixels (as they are) illuminated by the LiDAR and in certain cases, the camera sensor may read pixels that are not illuminated by the LiDAR. The pixels illuminated by the LiDAR and read by the camera sensor (also referred to herein as lidar pixels 606) can create a pattern 607 in the image 602.

The pattern 607 can have one or more slanted lines and one or more vertical or horizontal lines (other line shapes are possible depending on the relative movement of the rangefinder system and pixel reading of the camera sensor). In some cases, the vertical and/or horizontal lines of the pattern 607 can correspond to an edge of the image 602 (e.g., the right, top, and bottom edges of the pattern 607), and/or an edge of the lidar scan 604 (e.g., top or bottom of the lidar scan 604). For example, if the lidar scan is small enough compared to the image 602, the top and bottom of the lidar scan 604 may be captured by the image 602 and shown as part of the pattern 607.

In certain cases, slanted lines of the pattern 607 can correspond to an edge of a lidar scan 604 (e.g., leading and trailing edge of the lidar scan 604) and/or an edge between lidar pixels 606 and non-lidar pixels (e.g., pixels that are not illuminated by the LiDAR when they are read by the camera sensor). For example, the lidar scan may progress faster than the camera sensor is able to read cells on each row leading to a slanted line (e.g., left side of pattern 606) in which pixels on one side of the slanted line are lidar pixels 606 and pixels on the other side of the slanted line are non-lidar pixels. As illustrated in FIG. 6A, in certain cases, the camera sensor may capture some or (only) one edge of the lidar scan 604 in the image 602.

Based on the pattern 607 of the lidar pixels 606 in the image 602, the synchronization system 502 may adjust the camera exposure time, the lidar rotation speed, the camera field of view 508, and/or the LiDAR field of view 512 (as appropriate or possible to adjust with other system constraints) so that two edges of the lidar scan 604 are shown in the image 602. In some cases, the synchronization system 502 can use two edges of the lidar scan 604 detected in the image 602 to determine a center of the lidar scan 604. The center of the lidar scan 604 can be used to determine whether the rangefinder system is synchronized with the camera.

As a non-limiting example, the synchronization system 502 may obtain a first image from the image sensor (e.g., the cameras 202a) and detect a first edge of a first pattern in the first image without detecting a second edge. The first pattern may correspond to at least one electromagnetic wave emitted from the rangefinder system (e.g., the LiDAR sensors 202b).

Based on a determination that a second edge of the first pattern is not detected, the synchronization system 502 may adjust at least one or combinations of an exposure time of the image sensor, camera firing offset, a lidar phase lock offset angle, rolling shutter delay, lidar rotation speed, field of views, and the like. For example, the synchronization system 502 may increase the speed by which the camera reads the pixels and/or decrease the exposure time of the image sensor.

Subsequently, the synchronization system 502 may obtain a second image. For example, a camera 202a can capture a second image with a decreased exposure time. With a decreased exposure time, a second edge of the lidar scan 604 may be captured on the camera image 602 (e.g., the trailing edge of the lidar scan 604, which is the right side in FIG. 6A). The synchronization system 502 can detect a first and a second edge of a second pattern in the second image. In some cases, the pattern may be a parallelogram. In some such cases, the top and bottom edges of the segment may be parallel (and horizontal) and the leading and trailing edges may be parallel (and slanted).

The synchronization system 502 may determine an offset between the lidar scan 604 and a location on the image 602 using the first edge of the second pattern in the second image and the second edge of the second pattern in the second image, as described herein. For example, the synchronization system 502 can determine the horizontal center of the lidar scan 604 using the leading and trailing edges (first and second edges) and compare the horizontal center of the lidar scan 604 with the horizontal center of the image 602. The offset can be determined as the difference between the two centers. As described herein, depending on the direction of rotation of the rangefinder system and the camera sensor, other centers, such as a vertical center can be determined and used to determine the offset and whether the camera sensor and rangefinder system are synchronized.

Based on the magnitude of the offset, the synchronization system 502 may determine whether the rangefinder system and camera sensor are synchronized. If the magnitude of the offset satisfies the synchronization threshold, the synchronization system 502 can determine that the rangefinder system and camera sensor are not synchronized. If the magnitude of the offset does not satisfy the synchronization threshold, the synchronization system 502 can determine that the rangefinder system and camera sensor are synchronized. In some cases, the synchronization threshold may be zero such that any difference between the two centers (e.g., offset>0) can indicate the rangefinder system and camera sensor are not synchronized.

FIGS. 6B and 6C are diagrams illustrating different example representations 600B and 600C of offsets. FIG. 6B depicts a representation 600B of a line 612 with a y-intercept 610 and x-intercept 608 of lidar scan 604 with respect to the image 602. The line 612 may be defined by a line equation (1):

$$y = mx + b \qquad \text{Line Equation (1):}$$

Where m is a slope of the line 612 and b is the intersection of they axis, defined as the left edge of the camera image. In some cases, the slope m may be a function of rolling shutter delay of the camera. In some cases, the intersection of the y-axis b may be a function of camera firing offset, a lidar phase lock offset angle, and an angle between the center line 506 and the phase angle 510. In some cases, the line 612 may be determined based on pixel coordinates in the camera image. The line 612 may be determined for each image and compared to other lines 612 (or averages thereof) for other images to ensure the pattern is repeating consistently and the synchronization is persistent over time. Thus, a line 612 with a different slope or different y-intercept may be "offset" from other lines 612 (or an average of lines 612). For instance, an edge threshold may indicate a range of combinations of slopes and y-intercepts that may be considered sufficiently similar.

FIG. 6C depicts a representation 600C of an offset 618 between a camera center line 614 of camera image 602 and lidar scan center line 616 of lidar scan 604. In some cases, the synchronization system 502 may determine the offset 618 by comparing the camera center line 614 to the lidar scan center line 616. For instance, the synchronization system 502 can determine the horizontal distance between a vertical line corresponding to the lidar scan center line 616 and a vertical line corresponding to the camera center line 614. Moreover, the synchronization system 502 may determine whether the horizontal distance between the camera center line 614 of camera image 602 and lidar scan center line 616 satisfies an offset threshold distance (e.g., 0 or a preset number of pixels).

In some cases, the synchronization system 502 can store the camera center line 614 (e.g., a center of camera image) or determine it by dividing the camera image in equal halves.

In certain cases, the synchronization system 502 can determine the lidar scan center line 616 using leading and trailing edges of the lidar scan 604 that are captured in the camera image 602. In some cases, the synchronization system 502 can determine the lidar scan center line 616 from a centroid of the pattern. The centroid may be determined depending on the geometric shape of the pattern. For instance, if the pattern is a parallelogram, the synchronization system 502 can determine centroid using the intersection point of the diagonals of the parallelogram. With reference to FIG. 5C, the diagonals may be determined from the edges 524 and 526 that are captured in the image 517.

To determine synchronization between the different sensors, the synchronization system can use the determined pattern in the image. In some cases, the synchronization system 502 may compare edges between images (e.g., offsets of edges between images), compare a center of a pattern and a center of an image (an offset within one image), and/or compare offsets of centers (of patterns and images) between images to determine the synchronization.

In some cases, if an edge of the pattern changes more than an edge threshold amount between successive images (or from an average sampled from images), the synchronization system 502 may determine a synchronization issue exists for the cameras 202a and/or the LiDAR sensors 202b. For instance, the LiDAR sensors 202b may be inconsistently rotating at the lidar rotation speed, or the cameras 202a may be inconsistently triggering in accordance with the camera sensing cycle, and thus the cameras 202a and the LiDAR sensors 202b may not be synchronized. In some cases, if a center of the pattern is not aligned (e.g., within the offset threshold distance) with the center of the camera image, the synchronization system 502 may determine the cameras 202a and the LiDAR sensors 202b are not synchronized.

In some cases, to compare edges between images, the synchronization system 502 can identify an edge of a pattern in a first image, obtain a second image from the image sensor (e.g., the camera), and detect at least one edge of the second pattern (referred to as at least one second edge) in the second image, as discussed herein. The synchronization system 502 may then either (or both): (1) compare the at least one first edge to the at least one second edge, or (2) determine a second offset between the second pattern and the second image based on the at least one second edge of the second pattern.

In the case of comparing the at least one first edge to the at least one second edge, the synchronization system 502 may determine whether slopes and y-intercepts of the at least one first edge and the at least one second edge are within the edge threshold of each other. If the edge threshold is satisfied, the synchronization system 502 may determine the pattern is consistently appearing in the image with a same orientation and location over time. If the edge threshold is not satisfied, the synchronization system 502 may determine the lidar sensors 202b and the camera 202a are not synchronized (e.g., one or both are m is-triggering).

In the case of determining the second offset between the second pattern and the second image based on the at least one second edge of the second pattern, the synchronization system 502 may determine whether the first offset and the second offset are within a consistency threshold of each other, and/or both of the first offset and the second offset are within the offset threshold distance. The consistency threshold may indicate a range (referred to as threshold offset difference) of acceptable changes over time, such that the offset remains constant across a plurality of images.

In some cases, the synchronization threshold may include at least one or combinations the edge threshold, offset threshold distance, and consistency threshold. In some cases, "determining the first offset and the second offset satisfy the synchronization threshold" may refer to determining whether the first offset and the second offset satisfy either or both the consistency threshold or the offset threshold distance. In some cases, to determine whether the consistency threshold is satisfied, the synchronization system 502 can determine a difference between the first offset and the second offset and determine whether the difference satisfies the threshold offset difference.

In some cases, to detect the at least one edge of the pattern in the image, the synchronization system 502 may detect a first edge of the pattern and a second edge of the pattern. The synchronization system 502 may determine the offset between the pattern and the image based on the first edge of the pattern and the second edge of the pattern. For instance, the synchronization system 502 may determine a centroid of the pattern using the first edge and the second edge, as discussed herein. The first edge may be a leading edge and the second edge may a trailing edge.

In some cases, to determine the offset, the synchronization system 502 may determine a slope of the edge; based on at least the slope, determine a perimeter or area of the pattern; and determine the center of the pattern based on the perimeter or the area of the pattern. The synchronization system 502 may then compare the center of the pattern with a center of the image; and determine the offset based on the difference between the center of the pattern and the center of the image. For instance, the synchronization system 502 may determine the slope of a line, as described herein, for the edge. The synchronization system 502 may then determine the perimeter or area based on the slope and/or the line of the edge by extrapolating, because the other edge may be assumed to be parallel (in the case of a parallelogram). As described herein, the synchronization system 502 may determine the center of the pattern based on the centroid of a known geometric shape of the pattern. Subsequently, the synchronization system 502 may proceed to compare the centers and determine the offset, as described herein.

In some cases, the center of the pattern is a horizontal center of the pattern, and the center of the image is a horizontal center of the image. In some cases, the center of the pattern is a vertical center of the pattern, and the center of the image is a vertical center of the image.

In some cases, to determine the offset, the synchronization system 502 may detect a first edge and a second edge of the pattern and determine a slope and axis intercept for each of the first edge and the second edge. For instance, with reference to FIG. 5C, the synchronization system 502 may determine a slope and y-intercept for a line for each edge 524 and 526. The synchronization system 502 may then determine a center of the pattern based on the slope and axis intercept for each of the first edge and the second edge.

Subsequently, the synchronization system 502 may proceed to compare the centers and determine the offset, as described herein.

In some cases, to determine whether the offset satisfies the synchronization threshold, the synchronization system 502 may determine whether one or more (or all) of the edge threshold, the offset threshold distance, and the consistency threshold are satisfied. In some cases, the synchronization threshold may be satisfied if the offset is greater than zero (e.g., the centers do not align for the offset threshold distance).

In some cases, to adjust a synchronization parameter of the image sensor or rangefinder system, the synchronization system 502 may adjust the image sensor triggering timing and/or adjust the phase lock angle of the rangefinder system (e.g., the LiDAR sensors 202b). In this manner, the synchronization system 502 may time shift either of sensing devices to align sensing time periods to sense a same field of view of an environment at a same time. Other synchronization parameters that may be adjusted, in addition to or alternatively, include exposure time of the camera, rolling shutter delay of the camera, lidar rotation speed.

In some cases, the synchronization system 502 may retune the image sensor triggering timing and/or the phase lock angle. For instance, the synchronization system 502 may obtain a set of images, then process the images as discussed herein to detect leading and trailing edges. The synchronization system 502 may then determine y-intercepts and slopes of the edges for each image, as discussed herein. The synchronization system 502 may then compare the slopes and y-intercepts across the set of images. For instance, the synchronization system 502 may perform a statistical analysis to determine whether they are consistent (between different images of the set) and synchronized, as discussed herein. If not, the synchronization system 502 may retune either or both the image sensor triggering timing and/or the phase lock angle. If they are consistent and synchronized, the synchronization system 502 may determine the synching is sufficient for downstream processing (e.g., in the perception system 402).

To retune either or both the image sensor triggering timing and/or the phase lock angle, the synchronization system 502 may transmit a new mage sensor triggering timing to the cameras 202a and/or transmit a new phase lock angle to the LiDAR sensors 202b. After transmitting the new image sensor triggering timing and/or the new phase lock angle, the synchronization system 502 may then obtain a second set of images and perform the same process over again.

In some cases, the synchronization system 502 can treat the lidar scan as a ground truth and (only) adjust the image sensor triggering timing. In this case, the synchronization system 502 may obtain a set of images, then post-process the images as discussed herein to detect leading and trailing edges. The synchronization system 502 may then determine y-intercepts and slopes of the edges for each image, as discussed herein. The synchronization system 502 may then determine whether y-intercepts across the set of images are greater than a reference range or less than the reference range. In the case y-intercepts across the set of images are greater than the reference range, the synchronization system 502 may increase the image sensor triggering timing. In the case y-intercepts across the set of images are less than the reference range, the synchronization system 502 may decrease the image sensor triggering timing. In the case y-intercepts across the set of images are not greater or lesser than the reference range, the synchronization system 502 may determine the synching is sufficient for downstream processing (e.g., in the perception system 402).

In some cases, the synchronization system 502 may determine an end-to-end system delay of the cameras 202a. For instance, the end-to-end system delay may be from a time sync pulse of the shared clock received by a vision processing system on a chip (SoC) to when image data is readout. This data may be logged and used to detect degradations in end-to-end system delay.

Thus, in one or more cases of the present disclosure, the system and methods of the present disclosure may accurately determine a quantitative quality and consistency of LiDAR/camera data capture synchronization. Moreover, the systems and methods may monitor the LiDAR scan pattern from individual camera images and confirm, for each frame, that the camera records a synchronized (and complete) lidar scan as the lidar sensors rotate through a camera field of view. For instance, the y-intersection and slope of an edge of the LiDAR pattern may be parameters that determine the LiDAR-cam era sync accuracy.

In this manner, sensor data syncing of the lidar sensors and camera may be assured. Sensor data syncing may inform an autonomous vehicle perception pipeline, so that the different sensor modalities have an accurate perceived view of the environment at a same time. Moreover, as the systems and methods of the present disclosure are an end-to-end synchronization (e.g., from time sync pulse to data acquisition), the systems and methods account for all factors which influence the timing between the LiDAR and camera. Example Flow Diagram FIG. 7 is a flow diagram illustrating an example of a routine 700 implemented by one or more processors to synchronize different types of sensors. The flow diagram illustrated in FIG. 7 is provided for illustrative purposes only. It will be understood that one or more of the steps of the routine 700 illustrated in FIG. 7 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 702, the synchronization system 502 obtains an image from an image sensor. For instance, the synchronization system 502 may request and receive a set of images, including at least one image, as described herein and/or the synchronization system 502 may receive at least one image as the image sensor generates images.

At block 704, the synchronization system 502 may detect at least one edge of a pattern in the image, the pattern corresponding to at least one electromagnetic wave emitted from a rangefinder system. For instance, the synchronization system 502 may process the image to detect a segment of the image that has lidar pixels 516 and determined edges 524 and 526 by a best fit line along a leading and trailing edge of the segment, as described herein.

At block 706, the synchronization system 502 may determine an offset between the pattern and the image based on the at least one edge of the pattern. For instance, the synchronization system 502 may compare edges between images (e.g., edges offset between images), compare a center of a pattern and a center of an image (e.g., an offset within one image), and/or compare offsets of centers (of patterns and images) between images, as described herein.

At block 708, the synchronization system 502 may determine the offset satisfies a synchronization threshold. For instance, the synchronization system 502 may whether the edges between images, an offset within one image, or offsets of centers between images satisfy one or combinations of the edge threshold, offset threshold distance, or consistency threshold, as described herein.

At block 710, the synchronization system 502 may, based on the determining the offset satisfies a synchronization threshold, adjust a synchronization parameter of the image sensor or rangefinder system. For instance, the synchronization system 502 may determine (based on the thresholds) that the camera 202a and lidar sensors 202b are not synchronized and adjust the image sensor triggering timing and/or adjust the phase lock angle, as described herein.

Fewer, more or different blocks can be included in the routine 700. Moreover, the order of the blocks can be changed.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/ sub-entity of a previously recited step or entity.

EXAMPLES

Clause 1. A method, comprising: obtaining an image from an image sensor; detecting at least one edge of a pattern in the image, the pattern corresponding to at least one electromagnetic wave emitted from a rangefinder system; determining an offset between the pattern and the image based on the at least one edge of the pattern; determining the offset satisfies a synchronization threshold; and based on the determining the offset satisfies a synchronization threshold, adjusting a synchronization parameter.

Clause 2. The method of Clause 1, wherein the image is a first image, the pattern is a first pattern, and the method further comprises: obtaining a second image from the image sensor; detecting at least one edge of a second pattern in the second image, the second pattern corresponding to at least one electromagnetic wave emitted from the rangefinder system; determining a second offset between the second pattern and the second image based on the at least one edge of the second pattern, wherein determining the first offset satisfies the synchronization threshold comprises determining the first offset and the second offset satisfy the synchronization threshold, and wherein adjusting the synchronization parameter comprises adjusting the synchronization parameter based on the determining the first offset and the second offset satisfy the synchronization threshold.

Clause 3. The method of Clause 2, wherein determining the first offset and the second offset satisfy the synchronization threshold comprises determining a difference between the first offset and the second offset and determining the difference satisfies a threshold offset difference, Clause 4. The method of any of Clauses 1-3, wherein detecting the at least one edge of the pattern in the image comprises detecting a first edge of the pattern and a second edge of the pattern, and wherein determining the offset between the pattern and the image comprises determining the offset between the pattern and the image based on the first edge of the pattern and the second edge of the pattern.

Clause 5. The method of Clause 4, wherein the first edge is a leading edge and the second edge is a trailing edge.

Clause 6. The method of any of Clauses 1-5, wherein the at least one image is a second image, the pattern is a second pattern, and the at least one edge is a first edge of the second pattern, the method further comprising: obtaining a first image from the image sensor; detecting a first edge of a first pattern in the first image, the first pattern corresponding to at least one electromagnetic wave emitted from the rangefinder system; based on a determination that a second edge of the first pattern is not detected, adjusting an exposure time of the image sensor, wherein the adjusted exposure time is used to generate the second image; and detecting a second edge of the second pattern in the second image, wherein determining the offset between the second pattern and the second image is based on the first edge of the second pattern and the second edge of the second pattern.

Clause 7. The method of any of Clauses 1-6, wherein the image is a camera image.

Clause 8. The method of any of Clauses 1-7, wherein the electromagnetic wave is an optical beam, the rangefinder system is a LiDAR, and the pattern is a LiDAR pattern.

Clause 9. The method of any of Clauses 1-8, wherein the electromagnetic wave is a radio wave, the rangefinder system is a radar, and the pattern is a radar pattern.

Clause 10. The method of any of Clauses 1-9, wherein determining the offset comprises: determining the slope of the edge; based on the slope, determining a perimeter or area of the pattern; determining the center of the pattern based on the perimeter or the area of the pattern; comparing the center of the pattern with a center of the image; and determining the offset based on the difference between the center of the pattern and the center of the image.

Clause 11. The method of Clause 10, wherein the center of the pattern is a horizontal center of the pattern, and the center of the image is a horizontal center of the image.

Clause 12. The method of Clause 10, wherein the center of the pattern is a vertical center of the pattern, and the center of the image is a vertical center of the image.

Clause 13. The method of any of Clauses 1-12, wherein determining the offset satisfies the synchronization threshold comprises determining the offset is greater than zero.

Clause 14. The method of any of Clauses 1-13, wherein adjusting the synchronization parameter comprises adjusting the image sensor triggering timing.

Clause 15. The method of any of Clauses 1-14, wherein adjusting the synchronization parameter comprises adjusting the phase lock angle of the rangefinder system.

Clause 16. The method of any of Clauses 1-15, wherein detecting the at least one edge of the pattern includes detecting a first edge and a second edge, and wherein determining the offset between the pattern and the image based on the at least one edge of the pattern includes: determining a slope and axis intercept for each of the first edge and the second edge; determining a center of the pattern based on the slope and axis intercept for each of the first edge and the second edge; and determining a difference between a camera center line of the image and the center of the pattern.

Clause 17. The method of any of Clauses 1-16, wherein the pattern forms a parallelogram in image.

Clause 18. The method of any of Clauses 1-17, wherein the rangefinder system is configured to scan horizontally, and the image sensor is configured to scan vertically.

Clause 19. A system, comprising: at least one processor, and at least one non-transitory storage media storing instructions that, when executed by the at least one processor, cause the at least one processor to: obtain an image from an image sensor; detect at least one edge of a pattern in the image, the pattern corresponding to at least one electromagnetic wave emitted from a rangefinder system; determine an offset between the pattern and the image based on the at least one edge of the pattern; determine the offset satisfies a synchronization threshold; and based on the determining the offset satisfies a synchronization threshold, adjust a synchronization parameter Clause 20. At least one non-transitory storage media storing instructions that, when executed by at least one processor, cause the at least one processor to: obtain an image from an image sensor; detect at least one edge of a pattern in the image, the pattern corresponding to at least one electromagnetic wave emitted from a rangefinder system; determine an offset between the pattern and the image based on the at least one edge of the pattern; determine the offset satisfies a synchronization threshold; and based on the determining the offset satisfies a synchronization threshold, adjust a synchronization parameter.

What is claimed is:

1. A method, comprising:

obtaining an image from an image sensor;

detecting at least one edge of a pattern in the image, the pattern corresponding to at least one electromagnetic wave emitted from a rangefinder system;

determining an offset between the pattern and the image based on the at least one edge of the pattern, wherein determining the offset between the pattern and the image comprises:

determining a slope of the at least one edge, based on the slope, determining a perimeter or area of the pattern, determining a center of the pattern based on the perimeter or the area of the pattern, determining a difference between the center of the pattern and a center of the image, and determining the offset based on the difference between the center of the pattern and the center of the image;

determining the offset satisfies a synchronization threshold; and based on determining the offset satisfies the synchronization threshold, adjusting a synchronization parameter of the image sensor or the rangefinder system.

2. The method of claim 1, wherein the image is a first image, the pattern is a first pattern, and the offset is a first offset, the method further comprising:

obtaining a second image from the image sensor;

detecting at least one edge of a second pattern in the second image, the second pattern corresponding to at least one electromagnetic wave emitted from the rangefinder system; and determining a second offset between the second pattern and the second image based on the at least one edge of the second pattern, wherein determining the first offset satisfies the synchronization threshold comprises determining the first offset and the second offset satisfy the synchronization threshold, wherein adjusting the synchronization parameter comprises adjusting the synchronization parameter based on determining the first offset and the second offset satisfy the synchronization threshold.

3. The method of claim 2, wherein determining the first offset and the second offset satisfy the synchronization threshold comprises determining a difference between the first offset and the second offset and determining the difference satisfies a threshold offset difference.

4. The method of claim 1, wherein detecting the at least one edge of the pattern in the image comprises detecting a first edge of the pattern and a second edge of the pattern, and wherein determining the offset between the pattern and the image comprises determining the offset between the pattern and the image based on the first edge of the pattern and the second edge of the pattern.

5. The method of claim 4, wherein the first edge is a leading edge and the second edge is a trailing edge.

6. The method of claim 1, wherein the image is a second image, the pattern is a second pattern, and the at least one edge is a first edge of the second pattern, the method further comprising:

obtaining a first image from the image sensor;

detecting a first edge of a first pattern in the first image, the first pattern corresponding to at least one electromagnetic wave emitted from the rangefinder system;

based on a determination that a second edge of the first pattern is not detected, adjusting an exposure time of the image sensor, wherein the adjusted exposure time is used to generate the second image; and detecting a second edge of the second pattern in the second image, wherein determining the offset between the second pattern and the second image is based on the first edge of the second pattern and the second edge of the second pattern.

7. The method of claim 1, wherein the image is a camera image.

8. The method of claim 1, wherein the at least one electromagnetic wave is an optical beam, the rangefinder system is a LiDAR, and the pattern is a LiDAR pattern.

9. The method of claim 1, wherein the at least one electromagnetic wave is a radio wave, the rangefinder system is a radar, and the pattern is a radar pattern.

10. The method of claim 1, wherein the center of the pattern is a horizontal center of the pattern, and the center of the image is a horizontal center of the image.

11. The method of claim 1, wherein the center of the pattern is a vertical center of the pattern, and the center of the image is a vertical center of the image.

12. The method of claim 1, wherein determining the offset satisfies the synchronization threshold comprises determining the offset is greater than zero.

13. The method of claim 1, wherein adjusting the synchronization parameter comprises adjusting a triggering timing the image sensor.

14. The method of claim 1, wherein adjusting the synchronization parameter comprises adjusting a phase lock angle of the rangefinder system.

15. The method of claim 1, wherein detecting the at least one edge of the pattern includes detecting a first edge and a second edge, wherein determining the slope of the at least one edge comprises determining a first slope of the first edge and a second slope of the second edge, and wherein determining the offset between the pattern and the image based on the at least one edge of the pattern includes:

determining a first axis intercept for the first edge and a second axis intercept for the second edge, wherein determining the center of the pattern comprises determining the center of the pattern based on the first slope, the second slope, the first axis intercept, and the second axis intercept, wherein determining the difference between the center of the pattern and the center of the image comprises determining a difference between a camera center line of the image and the center of the pattern, wherein determining the offset based on the difference between the center of the pattern and the center of the image comprises determining the offset based on the difference between the camera center line of the image and the center of the pattern.

16. The method of claim 1, wherein the pattern forms a parallelogram in the image.

17. The method of claim 1, wherein the rangefinder system is configured to scan horizontally, and the image sensor is configured to scan vertically.

18. A system, comprising:

at least one processor, and at least one non-transitory storage media storing instructions that, when executed by the at least one processor, cause the at least one processor to:

obtain an image from an image sensor;

detect at least one edge of a pattern in the image, the pattern corresponding to at least one electromagnetic wave emitted from a rangefinder system;

determine an offset between the pattern and the image based on the at least one edge of the pattern, wherein to determine the offset between the pattern and the image, the instructions cause the at least one processor to:

determine a slope of the at least one edge, based on the slope, determine a perimeter or area of the pattern, determine a center of the pattern based on the perimeter or the area of the pattern, determine a difference between the center of the pattern and a center of the image, and determine the offset based on the difference between the center of the pattern and the center of the image;

determine the offset satisfies a synchronization threshold; and based on determining the offset satisfies the synchronization threshold, adjust a synchronization parameter of the image sensor or the rangefinder system.

19. At least one non-transitory storage media storing instructions that, when executed by at least one processor, cause the at least one processor to:

obtain an image from an image sensor;

detect at least one edge of a pattern in the image, the pattern corresponding to at least one electromagnetic wave emitted from a rangefinder system;

determine an offset between the pattern and the image based on the at least one edge of the pattern, wherein to determine the offset between the pattern and the image, the instructions cause the at least one processor to:

determine a slope of the at least one edge, based on the slope, determine a perimeter or area of the pattern, determine a center of the pattern based on the perimeter or the area of the pattern, determine a difference between the center of the pattern and a center of the image, and determine the offset based on the difference between the center of the pattern and the center of the image;

determine the offset satisfies a synchronization threshold; and based on determining the offset satisfies the synchronization threshold, adjust a synchronization parameter of the image sensor or the rangefinder system.

\* \* \* \* \*